US012782128B2

(12) United States Patent
Török et al.

(10) Patent No.: US 12,782,128 B2
(45) Date of Patent: Nov. 3, 2026

(54) AUTOMATIC, REFERENCE-FREE PRECISE STATIONING OF A GEODETIC SURVEY INSTRUMENT BASED ON ENVIRONMENT INFORMATION

(71) Applicant: LEICA GEOSYSTEMS AG, Heerbrugg (CH)

(72) Inventors: Zoltán Török, Berneck (CH); Bernhard Metzler, Dornbirn (AT); Elmar Van Der Zwan, Walzenhausen (CH); Holger Strittmatter, Constance (DE)

(73) Assignee: LEICA GEOSYSTEMS AG, Heerbrugg (CH)

( * ) Notice: Subject to any disclaimer, the term of this patent is extended or adjusted under 35 U.S.C. 154(b) by 649 days.

(21) Appl. No.: 18/227,844

(22) Filed: Jul. 28, 2023

(65) Prior Publication Data

US 2024/0035820 A1 Feb. 1, 2024

(30) Foreign Application Priority Data

Jul. 29, 2022 (EP) .................................... 22187869

(51) Int. Cl.
*G01C 15/00* (2006.01)
*G06T 7/73* (2017.01)

(52) U.S. Cl.
CPC .............. *G01C 15/002* (2013.01); *G06T 7/73* (2017.01)

(58) Field of Classification Search
CPC ...... G01C 15/002; G01C 11/02; G01C 21/20; G01C 1/04; G01C 11/00; G01C 9/00;
(Continued)

(56) References Cited

U.S. PATENT DOCUMENTS 8,553,212 B2 10/2013 Jaeger et al.
8,699,756 B2 4/2014 Jensen
(Continued)

FOREIGN PATENT DOCUMENTS

DE 11 2006 003 390 B4 5/2019
EP 2 219 011 A1 8/2010
(Continued)

OTHER PUBLICATIONS

Extended European Search Report dated Jan. 30, 2023 as received in Application No. 22187869.7.

*Primary Examiner* — Yuqing Xiao
*Assistant Examiner* — Jempson Noel
(74) *Attorney, Agent, or Firm* — Maschoff Brennan

(57) ABSTRACT

An automatic stationing of a geodetic survey instrument. The instrument comprises a targeting unit to provide targeting data, an imaging sensor, wherein the axis is referenceable to a targeting direction, and a computing unit. The automatic stationing comprises the steps of 1.) acquiring an image of the environment, 2.) creating a catalog of features based on the image and providing a score of applicability for each feature, 3.) selecting a first set of features based on the score of applicability and providing a first targeting data, 4.) recognizing a relocation of the instrument 5.) selecting a second set of features from the first set of features, and providing a second targeting data and 6.) determining the fine pose relative to the first pose based on the first and second set of targeting data.

15 Claims, 4 Drawing Sheets

(58) Field of Classification Search
CPC ........ G01C 15/00; G01C 21/005; G06T 7/73; G06T 2207/30244; G06V 10/17; G06V 20/10; G01S 19/45; G01S 19/46
See application file for complete search history.

(56) References Cited

U.S. PATENT DOCUMENTS

| | | | | |
|---|---|---|---|---|
| 9,958,269 | B2 | 5/2018 | Metzler et al. | |
| 2007/0139262 | A1 | 6/2007 | Scherzinger | |
| 2011/0064312 | A1* | 3/2011 | Janky | G06T 7/74 382/195 |
| 2011/0102255 | A1 | 5/2011 | Scherzinger | |
| 2012/0014564 | A1 | 1/2012 | Jensen | |
| 2014/0267700 | A1* | 9/2014 | Wang | G01C 15/00 348/135 |
| 2015/0042977 | A1* | 2/2015 | Siercks | G01S 7/4817 356/4.01 |
| 2015/0098075 | A1* | 4/2015 | Bestler | G01S 7/4817 356/3.01 |
| 2015/0304634 | A1* | 10/2015 | Karvounis | G06F 18/21355 348/46 |
| 2016/0187130 | A1 | 6/2016 | Metzler et al. | |
| 2017/0109916 | A1* | 4/2017 | Kurz | G06T 19/006 |
| 2017/0276485 | A1* | 9/2017 | Pettersson | G01C 21/20 |
| 2018/0158200 | A1 | 6/2018 | Metzler et al. | |
| 2018/0356222 | A1 | 12/2018 | Metzler et al. | |
| 2019/0086206 | A1 | 3/2019 | Nishita | |
| 2020/0363202 | A1 | 11/2020 | Metzler et al. | |
| 2020/0401617 | A1* | 12/2020 | Spiegel | G06V 10/82 |
| 2021/0049784 | A1* | 2/2021 | Török | G06T 7/60 |
| 2021/0240762 | A1* | 8/2021 | Mayster | G06F 16/587 |
| 2022/0178690 | A1* | 6/2022 | Wallace | G06T 17/00 |

FOREIGN PATENT DOCUMENTS

| | | |
|---|---|---|
| EP | 2 404 137 A1 | 1/2012 |
| EP | 3 062 283 A1 | 8/2016 |
| EP | 3 222 969 A1 | 9/2017 |
| EP | 3 779 357 A1 | 2/2021 |
| EP | 3 779 359 A1 | 2/2021 |

* cited by examiner

AUTOMATIC, REFERENCE-FREE PRECISE STATIONING OF A GEODETIC SURVEY INSTRUMENT BASED ON ENVIRONMENT INFORMATION

FIELD OF THE DISCLOSURE

The present disclosure relates to a geodetic survey instrument comprising a targeting unit, an imaging sensor and a computing unit. The geodetic survey instrument exhibits an automatic stationing functionality based on pre-existing natural or manmade objects as references. The present disclosure further relates to a stationing method of the survey instrument and a computer program product based on it.

BACKGROUND OF THE DISCLOSURE

To gain information from static or moving objects according to the geodetic accuracy standards, in particular with centimetre precision or better, geodetic survey instruments, in particular total stations, tachymeters and motorized theodolites, are commonly used. Such instruments are configured to provide spherical coordinates and/or derived Cartesian coordinates of a single point or a plurality of single points according to the geodetic accuracy standards.

Total stations are a common class of geodetic survey instruments. By the way of example total stations are presented from here on as a representative of a generic geodetic survey instrument. The specific features of other types of geodetic survey instruments might be applied accordingly. Total stations essentially comprise targeting elements, single point distance measuring elements, in particular laser rangefinders, and angle sensors, with accuracy in the range of angular seconds. From here on, a “targeting unit” is understood to be an ensemble that can sight, aim, and measure one or more individual point. The targeting unit might be a single, integrated component of the total station, in particular co-axial sighting and single point distance measuring elements, in particular laser rangefinders.

Contemporary total stations are typically characterized by a compact design comprising the targeting unit, computing, controlling and data storage units in a single portable device. The computing unit might comprise the controlling and data storage units. Total stations are often used in combination with a retroreflective target object in particular a circular prism, and for such applications total stations typically comprise an automatic target search and tracking function. Objects equipped with retroreflective targets are commonly known as cooperative targets, while other targets, in particular diffusely reflective targets, are commonly known as non-cooperative targets.

To sight and target a designated target point generic total stations are equipped with a telescopic sight such as optical telescope. The telescopic sight can be aligned with the target point by pivoting and tilting the total station. By way of example, such a sighting device is described in EP 2 219 011. The spherical coordinates of the target points are then determined. A distance of the targeted object is determined by a range finding method, in particular with a laser rangefinder, while elevation and azimuth angles might be derived from angle readings provided by the angle sensors comprised by the survey instrument, in particular comprised by the targeting unit. By the way of example, unless otherwise specified, distance from/to the survey instrument will mean distance from the targeting unit. By the way of example azimuth angle unless otherwise specified is an angle to a reference direction, in particular to the north direction, while the elevation angle is an angle to the horizon, in particular to a calibrated horizon.

Contemporary total stations can also reference the instrument to an external coordinate system by precisely recording the reference marks in the environment. Upon determining such an external coordinate system all coordinative operations may be referenced to this external or a global coordinate system. Typical total stations are also equipped with a GNSS receiver. However, without an appropriate support infrastructure, e.g. base stations at referenced positions, the accuracy of the GNSS receivers are not fulfilling the geodetic accuracy requirements. Thus, they can only provide a coarse position data.

Contemporary total stations may also be equipped with a set of wireless modules to communicate with different types of external units. A non-exclusive list of external units comprise other survey instruments, handheld data acquisition devices, field computers or cloud services. In particular total stations may receive a digital model of the environment using the wireless module. EP 3 779 359 discloses a survey instrument comprising an appropriate interface for receiving a digital model of the environment and a method of referencing the survey instrument to the digital model.

Referencing the total station is typically a cumbersome, manual work. At least a coarse position of the total station, this might be provided using a GNSS position, and the absolute position of the visible reference markers in the proximity has to be known. Ideally the reference markers are reference markers of the Geodetic Control Network. The absolute pose of the surveying instrument is then derived by targeting and marking the said reference markers. This is typically carried out by manual targeting or by scanning the environment to seek and target such reference markers. E.g. EP 2 404 137 discloses such a scanning method.

During a typical survey task, in particular in indoor survey or surveying a complex site e.g. a construction yard, targeting and measuring all the points to be surveyed is not possible from one referenced site. This necessitates the relocation of the surveying instrument. Moreover, the relocation of the instrument often takes place along random trajectories, especially in the case an of indoor survey. This means that the pose of the instrument must be determined on multiple occasions.

For many survey tasks, especially in urban or indoor surveying, even obtaining the coarse pose of the instrument is difficult, since e.g. GNSS signals might not be present at every desirable surveying locations. The prior art contains multiple methods of localizing the survey instrument under such conditions. E.g. DE 11 2006 003 390, US 2011/102255, EP 3 222 969 discloses localization approaches. These methods on the other hand involve the manual measurement of one or more reference point using a prism pole or an equivalent auxiliary tool.

Coarse positioning systems based on system intern sensors like inertial measurement unit (IMU), visual positioning system (VPS), or combined visual inertial system (VIS), are especially advantageous since they can provide at least a coarse pose information. The utilization of IMU-s to aid the coarse positioning of the instrument is known in the prior art, e.g. US 2019/086206 discloses a system incorporating an IMU. IMU-s on the other hand might drift even during a relatively short timeframe of less than an hour, i.e they have to be referenced regularly.

VPS provide a coarse pose of the system by analyzing the visual information of the surroundings of the instrument. The VPS might be based on structure from motion (SfM), simultaneous localization and mapping (SLAM) or any other alternative method. The application of VPS in combination with a geodetic survey instrument are known in the prior art e.g. EP 3 062 283 discloses such a system. Such systems can provide coarse positioning without external signals. On the other hand since they are based on the interpretation of visual data such systems are error-prone in an environment with ambiguous features, e.g. a construction yard with many close to identical looking features, or where the contrast is changing rapidly, e.g. during an indoor survey task.

A so-called visual inertial simultaneous localization and mapping (VISLAM) system is disclosed e.g. in EP 3 779 357, i.e. the combination of a SLAM system with an IMU to combine the aspects of the two method for the coarse positioning. EP 3 779 357 also discloses the referencing of the pose of the survey system to a digital data. The survey system disclosed in EP 3 779 357 is on the other hand based on the creation of a point cloud which is a quite tedious work.

A typical survey environment comprises prominent features, i.e. objects with well recognizable geometry or appearance. For an outdoor survey these might be e.g. electric masts, church spires, antennas, but even natural objects like a tall tree. Similar objects can be defined for indoor survey tasks, e.g. corners, power sockets etc. Some of the features might be georeferenced. Utilizing prominent features in the environment is known in the prior art e.g. U.S. Pat. No. 9,958,269 discloses a method of deriving the pose of the survey instrument after relocation based on the pre-known or measured position of prominent features.

On one hand marking a large amount of features provides a safety margin, that at least a required minimum of features will be visible on the next site. On the other hand it increases the time required for stationing the survey instrument. Measuring only a few features might be tempting due to the reduced time on establishing the database. This could, however, lead to problem, that only a few features will be accessible from an otherwise desirable new survey location. Thus, the operator is forced to choose the accessible non-optimal features leading to a reduced accuracy or selecting a new survey site, which lead to a loss of time.

Providing a score of applicability for the features in the environment and a gross score of applicability regarding a readiness for relocation is therefore desirable for an efficient survey procedure. Determining from an image taken, a survey environment and a survey task which features will be likely useful could shorten the stationing process, while increase the robustness of it.

OBJECT OF THE DISCLOSURE

In view of the above circumstances, the object of the present disclosure is to provide a geodetic survey instrument comprising a targeting unit, an imaging sensor and a computing unit with a simplified and more efficient stationing.

A further object of the present disclosure is to provide an improved stationing in an unknown environment.

These objective are achieved by realizing the features described herein.

SUMMARY OF THE DISCLOSURE

The disclosure relates to a geodetic survey instrument comprises a targeting unit, an imaging sensor and a computing unit. The geodetic survey instrument may be man-portable in that the instrument is not attached to a vehicle, in particular a UAV, or a car, at least during the measurements. Furthermore, while the instrument might be attached to a transport vehicle during the relocation, the primary mode of relocating the instrument might be being carried by the operator.

The targeting unit is configured to target an object in an environment and to provide a targeting data measurement of the targeted object. The targeting might be realized manually by direct operator action. The targeting might also be realized semi-automatically, i.e. the operator selects possible targets from a list of identified/expected targets. The targeting might be carried out in a fully automatic mode, wherein the computing unit identifies and targets one or more targets. By the way of example, unless otherwise specified, from here on the targeting process is illustrated using a fully automatic mode. Specific features of other targeting methods might be applied accordingly. Targeting data might be targeting directions or coordinates. By the way of example coordinates are georeferenced absolute coordinates, fulfilling the geodetic accuracy standards, in particular centimeter accuracy or better.

The survey instrument might comprise a pose tracking unit configured to provide a tracking of coarse pose data of the instrument during movement of the instrument. The pose tracking unit might be permanently integrated into the survey instrument. The pose tracking unit might be temporarily attached or attachable to the survey instrument. The pose tracking unit might comprise a plurality of sensors. The present disclosure is not limited to embodiments, where the pose tracking unit is a single entity. Part of the sensors comprised by the pose tracking unit might be integrated to the survey instrument, while other sensors comprised by the pose tracking unit might be temporarily attached. The pose tracking unit might be configured to recognize a relocation of the instrument.

Coarse pose is pose information not fulfilling the geodetic accuracy standards, in particular position data with decimeter accuracy or worse. Fine is pose information according to geodetic accuracy standards. The fine pose might be referenced to an absolute reference system. The present disclosure is not limited to such cases and might be applicable to any arbitrary local reference system.

The optical axis of the imaging sensor is referenceable to a targeting direction of the targeting unit. The imaging sensor might provide true-angle photography, wherein the complete image is referenced to the targeting direction of the targeting unit. The imaging sensor might be an arrangement comprising a plurality of cameras. The image might be provided by rotating the survey instrument and stitching single images. The imaging sensor might provide a set of non-connected images containing angle information.

The imaging sensor might be configured for panoramic or full dome photography. The imaging sensor might be a wide-angle camera. In some embodiments the computing unit might discard a portion of the image containing no features. By the way of example, unless otherwise specified, from here the image is a contiguous full dome image. Specific features of other imaging methods might be applied accordingly.

The targeting unit, the pose tracking unit, and the imaging sensor are part of a functional and not structural definition of the components of the total station. In some embodiments the sighting unit of the targeting unit might also take the functional role of the imaging sensor. The imaging sensor might also act as the pose tracking unit via a VPS or SLAM functionality. The imaging sensor might utilize the motorized axes of the targeting unit to acquire a full dome image.

These and other alternative arrangements are within the sense of the present disclosure.

The computing unit is configured to store the fine pose data of the instrument, in particular also the coarse pose data, to provide targeting commands for the targeting unit, to read the targeting data or coordinates provided by the targeting unit, to read image data from the imaging sensor, and in particular to read the coarse pose data from the pose tracking unit. The computing unit is a functional definition. The computing unit might be a single entity integrated or permanently attached to the total station. The computing unit might be temporarily attached. The computing unit might comprise a plurality of computing sub-units, in particular the imaging sensor might have one or more computing sub-units. The computing unit might comprise handheld components. These and other alternative arrangements are within the meaning of the present disclosure.

The geodetic survey instrument comprises an automatic stationing functionality, the automatic stationing functionality is configured for providing the automatic execution of the steps of 1.) acquiring an image of the environment by the imaging sensor in a first pose of the instrument, 2.) creating or updating a catalog of referencing features based on the image, and calculating for each referencing feature a score of applicability by the computing unit, wherein the score of applicability characterizes an identifiability and/or measurability of the features, 3.) selecting a first set of features comprising a plurality of the features from the catalog of referencing features fulfilling a selection criterion regarding at least the score of applicability, and in particular further regarding a spatial distribution of the features in the first set of features, by the computing unit, 4.) in a first pose of the instrument providing measurement data for a first set of targeting data regarding targeting directions of the features in the first set of features, 5.) providing the first set of targeting data and assigning the targeting directions in the first set of targeting data to the respective features of the first set of features, 6.) performing a relocation of the instrument, 7.) selecting a second set of features from the first set of features by the computing unit, the selection is based on the score of applicability for each of the features, 8.) in a second pose of the instrument providing measurement data for a second set of targeting data regarding targeting directions of the features of the second set of features, 9.) providing the second set of targeting data and assigning the targeting directions in the second set of targeting data to the respective features of the second set of features, wherein at least one of the first and the second set of targeting data further comprises data regarding distances of the features of the respective set of features from the survey instrument, 10.) determining a fine pose of the second pose relative to the first pose based on the first and second set of targeting data.

Identifiability might characterize at least a retrievability of the feature in images acquired from different locations by the imaging sensor and measurability might characterize whether the position of the feature can be measured according to the geodetic accuracy standards. The score of applicability might depend on the score of applicability of other features, in particular whether another features with high score of applicability have been identified with similar targeting data.

The geodetic survey instrument might provide a feedback based on the total number of the features in the first set of features, their spatial distribution and their score of applicability whether the instrument is ready for relocation.

The selection of the referencing features might be dependent on the environment and a survey task. The features might be natural, e.g. tall trees or rock formations or manmade, e.g. church spires, power masts. For an indoor survey task prominent features might be corners of the room, doorframes, power sockets, furniture elements, construction materials, screws or rivets. The referencing features might be visual features, e.g. characterized by a specific shape, contrast, or pattern. The referencing features might be geometric features e.g. characterized by a specific size, in particular flat surfaces with cylindrical, rectangular or triangular shape. The person skilled in the art can provide a similar or alternative list depending on the environment and the survey task.

The referencing features might be provided by a previous survey task and/or previous steps in the same survey task, in particular manual measurements performed by the operator. The operator might manually add or remove features to the catalog of referencing features. The absolute coordinates of the referencing features might be known from other sources, in particular from a database, or from a design data of the environment.

The relocation of the instrument might be carried out along an essentially random path. The relocation might follow a 3D path, e.g. part of the relocation path might be along a stairway. The relocation path might contain a pause or an oscillatory phase, e.g. when the operator stops to open a door. The present disclosure does not place any limit on the possible relocation paths.

The present disclosure is in no way limited to the cases wherein the targeting of the features of the first or second set of features are executed utilizing the targeting unit. On the contrary, for survey instruments wherein the imaging sensor fulfil the geodetic accuracy requirements the imagining sensor might provide at least a part of the first and/or the second set of targeting data. The present disclosure is neither limited to the cases wherein the first set of targeting data is provided and assigned to the first set features in the first pose. On the contrary, the measurement data, in particular wherein the measurement data is an image, might be evaluated later, in particular in the second pose or off-line after finishing the survey task.

While the second set of features comprises a plurality of features from the first set of features, the present disclosure is not limited to the cases where measuring the first set of targeting data is precedent to measuring the second set of targeting data. The second set of features might be selected in the first pose of the instrument. The targeting data comprised by the second set of targeting data might be measured before selecting the second set of features. It goes without saying that neither the first nor the second pose corresponds to a time series of measurements. The instrument might be relocated from the first pose to the second pose. The instrument might be relocated from the second pose to the first pose. The instrument might be relocated via an intermediate pose. All of these paths are possible according to the present disclosure.

The imaging sensor might be configured to provide image patches from the image wherein the image patches respectively comprise at least one referencing feature from the first or the second set of referencing features. The image patches might be assigned to the respective referencing features. The instrument might be configured to derive targeting data based on the image patches, in particular relative targeting directions by comparing the patches assigned to the same referencing feature as seen from the first and second pose.

In some embodiments the survey instrument further comprises 1.) a base unit, 2.) a support unit mounted on the base and configured to be rotatable relative to the base by a motorized axis, and 3.) a first angle sensor configured to measure a rotation angle of the support unit. The targeting unit is mounted on the support unit and is tiltable around a motorized tilting axis, wherein the instrument comprises a second angle sensor configured to measure the tilting angle of the targeting unit. The targeting unit comprises a beam exit of a distance measuring beam of a distance meter, in particular of a laser distance meter. The measuring beam of the distance meter defining the targeting direction. The coordinates of the targeted reference marker might be derived from the distance measured by the distance meter and the rotation and tilting angles.

In some embodiments the survey instrument further comprise a pose tracking unit, configured to provide a tracking of coarse pose data of the instrument at least during movement of the instrument. In such embodiments the automatic stationing functionality might further comprise providing the tracking of the coarse pose data by the pose tracking unit and the selection a second set of features from the first set of features might be further based on the tracking of the coarse pose data. The pose tracking unit might be configured to automatically recognize a relocation of the instrument.

Embodiments wherein a tracking of coarse pose data being provided are especially beneficial since the targeting unit might automatically target the features based on the coarse pose data. The targeting unit might comprise a sighting unit. The field of view of the sighting unit might allow the sighting and targeting the features in the second set of features without further target searching step. This enables an especially time efficient stationing of the instrument. Nevertheless the present disclosure is not limited to cases wherein the features in the second set of features are sighted without any searching step. On the contrary, applying the present disclosure might be beneficial by providing at least a shortened searching step owing to the estimated direction of the features in the second set of features relative to the coarse pose of the instrument.

In some embodiments at least one sensor of the pose tracking unit is located in the base. Locating the sensor in the base is especially beneficial, since the base is a stable, inert position. Such embodiments might allow the determination of the drift of the sensor. Furthermore being located at the base, might allow a recalibration of the sensor. In spite of the above benefits the present disclosure is not limited to embodiments where the sensor is located in the base.

In some embodiments the pose tracking unit comprises at least one of 1.) VPS, 2.) an IMU, 3.) a GNSS receiver, 4.) a WLAN positioning system, 5.) a cellular network based positioning system, 6.) a Bluetooth positioning system, and 7.) a VISLAM.

In some embodiments the pose tracking unit comprises the VPS and/or the VISLAM system. The VPS and/or the VISLAM being based on the images provided by the imaging sensor. The pose tracking unit and the imaging sensor, in the sense of the present disclosure are functional and not structural definitions. Utilizing the same module both as VPS and as imaging sensor is possible according to the present disclosure. Alternatively the pose tracking unit and the imaging sensor might share part of their components.

In some embodiments the VPS is configured to provide a feature tracking data for a plurality of tracked features comprised by the first set of features. The survey instrument might be configured to provide a request for stationing based on the feature tracking data, in particular when one or more tracked features are lost. Such embodiments are especially advantageous in combination with a fast stationing method, wherein no target search step is necessary. A further advantage of these embodiments is that the catalog of referencing features might be updated after stationing the instrument.

In some embodiment the imaging sensor is arranged and configured for use in the sighting unit of the targeting unit for aligning the targeting direction onto a target to be measured. An advantage of this approach would be that no further dedicated imaging sensors are required. Furthermore, since the sighting unit is co-axial with the distance meter the images acquired by the sighting unit comprise no angle offset or backlash. In some embodiments at least a portion of the first and/or the second set of targeting data is provided by the imaging sensor Alternatively the survey instrument might utilize a dedicated imaging sensor. This approach might provide more flexibility, in particular in taking the image without rotating and/or tilting the survey instrument. For true angle cameras at least a portion of the first and/or the second set of targeting data might be provided by the imaging sensor. The present disclosure is not limited to any specific realization of the imaging sensor.

In some embodiments the automatic stationing functionality further comprises 1.) deriving a gross score of applicability based on scores of applicability of the features of the first set of features, and 2.) providing feedback to the operator on a readiness for relocation based on the gross score of applicability. The gross score of applicability might depend on the total number of features. The gross score of applicability might depend on the score of applicability of the individual features. The gross score of applicability might depend on the distribution of the features, in particular the direction from the survey instrument. The feedback might be that geodetic survey instrument is ready for relocation. The feedback might be that number of features is the first set of features is too low. The feedback might be that the score of applicability of the features in the first set of features is too low. The feedback might be a request for manually targeting one or more possible referencing features for the catalog of referencing features.

In some embodiments the survey instrument provides an assessment on the readiness for relocation based on the gross score of applicability upon receiving an operator request. The survey instrument might provide a feedback that the gross score of applicability is too low. The survey instrument might update the catalog of referencing features and the first set of features by automatically selecting new referencing features and providing and assigning the respective targeting data. An algorithm might be utilized to automatically identify additional features with a high score of applicability from the image captured in the first pose. The identified features might be added to the catalog of referencing features and/or the first set of features. The first set of targeting data might be updated with the targeting data of the newly identified features first set of features, in particular, the targeting unit is automatically aligned to the feature and a distance measurement is performed. The selection of features with a high score of applicability might be based on machine learning, in particular based on deep learning, where a machine trained algorithm is applied to the image.

In some embodiments a tracking gross score of applicability is derived based on the tracking of the coarse pose data and the score of applicability for each of the features in the first set of features. The survey instrument might be configured to provide a request for stationing based on the tracking gross score of applicability. Needless to say that the tracking of the gross score of applicability might be combinable with the tracking of individual features.

In some embodiments the computing unit is configured to receive a digital model of the environment. The digital model comprises one of 1.) a map of the environment, 2.) a design data of the environment, and 3.) a previous targeting data measurement data on the environment. The previous targeting data measurement data on the environment might have been measured by a further survey instrument. The computing unit might be further configured to reference the fine pose and/or the coarse pose of the survey instrument to the digital model.

The appropriate digital model might depend on the survey task and the environment. For an outdoor survey a map of the environment comprising navigational data and/or a list of landmarks and their coordinates might be optimal. For an indoor survey a building information model (BIM) or a computer aided design (CAD) of the environment might be optimal.

The design data might comprise a list of prominent features and their coordinates. The computing unit might refer to the information in the design data in the calculation of the score of applicability. The computing unit might recognize the type of environment and the survey task based on the received design data. The computing unit might export the type of environment and the survey task when exports the surveying task data.

In some embodiments the computing unit is configured to reference the position of the features in the catalog of referencing features to the digital model. Referencing according to the present disclosure might be merging the absolute position of the features with the coordinate system of the design data. Alternatively, referencing might be matching a list of landmarks and their coordinates from the design data and at least a part of the first set of targeting data of the first set of features. The computing unit might correct the first set of targeting data of the first set of features as a result of the matching. Alternatively, the computing unit might produce an error message indicating a discrepancy between the first set of targeting data and the respective coordinates from the design data.

In some embodiments the computing unit is further configured to 1.) receive an operator input on a requested second location, 2.) calculate a calculated visibility and/or a calculated score of applicability of the first set of features in the proximity of the requested second location, 3.) calculate a proposed second location for the instrument based on the calculated visibility and/or the score of applicability of the first set of features, 4.) provide guidance instructions for the operator to reach the proposed second location. The computing unit might be further configured to provide guidance instruction in respect of the survey environment and the survey task, in particular the walkability of the path.

The computing unit might consider other parameters in calculating the proposed second location. The other parameters might comprise feature related parameters, in particular apparent size of the feature, contrast of the feature, and redundancy and unambiguity of the feature. The computing might consider the accessibility of the proposed second location. Needless to say that the person skilled in the art could combine these and similar parameters in providing a method for selecting the proposed second location. The guidance instructions might comprise a path plotted on the map, arrows showing the walking direction, or similar visual or alternative, in particular audio, instructions. The computing unit might comprise a handheld unit to display the guidance instructions.

In some embodiments the survey instrument further comprises an automatic target search and tracking function for an identification of reference markers with known absolute positions. The automatic stationing functionality might further comprise 1.) updating the catalog of referencing features with identified reference markers, 2.) selecting at least one reference marker for the first set of features, 3.) comparing the respective targeting directions from the first set of targeting data and the known absolute position of the at least one reference marker, 4.) carrying out an assessment on the first set of targeting data based on a discrepancy of the respective targeting directions from the first set of targeting data and the known absolute position of the at least one reference marker. The second set of features might include the at least one reference marker. The second set of targeting data might be corrected with the known absolute position of the at least one reference marker.

The automatic target search and tracking function might also be beneficial for the cases when the survey instrument comprises a VPS/VISLAM as a pose tracking unit. Referencing the VPS/VISLAM utilizing recognized reference markers is especially beneficial as it might lead to a reduced drift of the coarse pose data, and with that the variance of the coarse pose might be reduced. The automatic target search and tracking function might be utilized to record the reference markers in the environment with known absolute position.

In some embodiments the computing unit is configured to identify flat surfaces in the environment based on the image and to calculate the coordinates of the flat surface based on plurality of point coordinates contained by the flat surface. While many prominent landmarks are recognizable by visual appearance, specific geometries, in particular extended flat surfaces of a specific dimension, can also be utilized as unambiguous prominent landmarks. The present disclosure is in no way limited to features identified by the visual appearance, but comprise features with unique geometries, in particular flat surfaces.

In some embodiments the score of applicability is based on at least one of 1.) line of sight of the features, 2.) apparent size of the features, 3.) the environment, 4.) the survey task, 5.) contrast of the features, 6.) positional stability of the feature, and 7.) redundancy and unambiguity of the features. Needless to say that the score of applicability might be based on a combination of the above. The score of applicability might be based on the combination of the above with further parameters. The survey instrument might comprise different pre-programmed options for the score of applicability. The pre-programmed options might be selected automatically by the survey instrument or by operator action.

In some embodiments the score of applicability is derived from a machine learning process. The machine learning process might be carried out externally. The machine learning might be a supervised learning, wherein the score of applicability is refined after comparing with the real identifiability and/or measurability of the features in a plurality of second poses. Alternatively, the survey instrument might provide feedback on the score of applicability to the machine learning process.

In some embodiments the survey instrument is configured to tag a survey data with a tagging pose of the survey instrument, wherein the tagging pose is either provided by 1.) the fine pose data, 2.) the coarse pose data. Tagging the measurements with the tagging pose is especially beneficial such that an off-line correction of the measurement data might be possible. The survey instrument might be relocated along a random path, wherein at least one of the measuring positions might be characterized only with the coarse pose data. The coarse pose data might be corrected with a measured drift of the instrument, wherein the drift is determined between two referenced poses. Complementary to the tagging pose a tagging time might also be provided.

In some embodiments the survey instrument is configured to store the first set of features, the first set of targeting data, the second set of features and the second set of targeting data. The survey system might be configured to update the tagging pose of the survey instrument based on the on the stored first set of targeting data and the stored second set of targeting data. Updating the tagging pose might be carried out off-line. The tagging pose might be updated utilizing a plurality of first and second sets of targeting data relating to different georeferenced positions. Furthermore, the correction might be applied "backward", that means that the first set of targeting data were determined after the second set of targeting data. The present disclosure is not limited to measure the first and second set of targeting data in a specific order.

The present disclosure also relates to a method of identifying a fine pose of a geodetic survey instrument. The method comprises the steps of 1.) acquiring an image of the environment by an imaging sensor of the instrument in a first pose of the instrument, 2.) creating or updating a catalog of referencing features based on the image, and calculating for each referencing feature a score of applicability, 3.) selecting a first set of features comprising a plurality of the features from the catalog of referencing features fulfilling a selection criterion regarding at least the score of applicability, and in particular further regarding a spatial distribution of the features in the first set of features, by the computing unit, 4.) in a first pose of the instrument providing measurement data for a first set of targeting data regarding targeting directions of the features in the first set of features, providing the first set of targeting data and assigning the targeting directions in the first set of targeting data to the respective features of the first set of features, 6.) performing a relocation of the instrument, and in particular providing the tracking of the coarse pose data, 7.) selecting a second set of features from the first set of features based on the score of applicability for each of the features, and in particular further based on the tracking of the coarse pose data, 8.) in a second pose of the instrument providing measurement data for a second set of targeting data regarding targeting directions of the features of the second set of features, 9.) providing the second set of targeting data and assigning the targeting directions in the second set of targeting data to the respective features of the second set of features, wherein at least one of the first and the second set of targeting data further comprises data regarding distances of the features of the respective set of features from the survey instrument, and 10.) determining a fine pose of the second pose relative to the first pose based on the first and second set of targeting data.

In some embodiments the method further comprises 1.) acquiring a second image of the environment in the second pose, 2.) identifying at least a part of the features comprised by first set of features based on image matching, and calculating a second score of applicability for the features in the first set of features, 3.) selecting the second set of features comprising a plurality of features from the first set of features based on the score of applicability and further based on the second score of applicability.

In some embodiments of the method the catalog of referencing features comprises one or more recognized flat surface and the first and the second set of targeting data comprise coordinates of the one or more flat surfaces, the coordinates of one or more flat surfaces being calculated from plurality of point coordinates contained by the respective flat surfaces.

In some embodiments of the method at least one of the first pose and the second pose is a referenced absolute pose.

In some embodiments of the method measuring the second set of targeting data is precedent to measuring the first set of targeting data.

In some embodiments of the method the instrument is relocated along a plurality of poses, wherein at least two poses in the plurality of the poses are georeferenced poses and at least one pose in the plurality of the poses is a non-georeferenced pose. The method further comprises updating the tagging pose of the at least one non-georeferenced pose by weighting the second set of targeting data derived in respect to the at least two georeferenced poses.

Needless to say that some embodiments of the method might benefit from one or more specific optional component of the survey instrument. In some embodiments of the method comprise the steps of 1.) carrying out of a survey task at the first pose of the instrument by measuring objects points in the surroundings of the device, in particular by an operator measurement, wherein for one or more measured point a corresponding image patch is automatically acquired, wherein the one or more image patch each representing one feature, in particular one recently detected feature, 2.) updating the catalog of referencing features based on the image patch and calculating by the computing unit the score of applicability for at least one recently detected feature, wherein the score of applicability is based on the respective image patches, 3.) selecting by the computing unit a first set of features comprising a plurality of the features from the catalog of referencing features, in particular comprising at least one recently detected feature, fulfilling a selection criterion regarding at least the score of applicability, 4.) providing measurement data for the first set of targeting data regarding targeting directions of the at least one recently detected features at least based on the respective image patch, in particular based on back-projected point coordinates, 5.) updating the gross score of applicability, based on the scores of applicability of the features of the updated first set of features, 6.) providing feedback to the operator on the readiness for relocation based on the gross score of applicability, in particular wherein the gross score of applicability exceeding a threshold 7.) optionally performing a feature search, in particular wherein the gross score of applicability is below the threshold, the feature search comprise a.) analyzing the image for candidates of features with a high score of applicability by the computing unit, b.) updating the catalog of referencing features based on the image patch, c.) selecting a first set of features comprising a plurality of the features from the catalog of referencing features, in particular comprising at least one feature detected in the feature search, d.) providing measurement data for the first set of targeting data regarding targeting directions of the at least one feature detected in the feature search, e.) updating the gross score of applicability, based on the scores of applicability of the features of the updated first set of features, f) repeating steps (a-e) until the readiness for relocation based on the gross score of applicability is achieved, 8.) performing a relocation of the instrument and providing the tracking of the coarse pose data, 9.) selecting a second set of features from the first set of features by the computing unit based on the score of applicability, 10.) providing a coarse targeting direction for the features of the second set of features based on the coordinates measured at the first pose and the tracking of the coarse pose data provided by the pose tracking unit, 11.) targeting by the targeting unit the features of second set of features based on the tracking of the coarse pose data and acquiring an image patch representing the respective feature of the second set of features, 12.) providing the second set of targeting data and assigning the targeting directions in the second set of targeting data to the respective features of the second set of features based on an offset determined between the image patch extracted from the image at the first pose and the image patches extracted from the image at the second pose, 13.) providing a distance measurement for the features of the second set of features by the aligning the targeting unit based on the accurate direction to feature and performing distance measurement, 14.) determining a fine pose of the second pose relative to the first pose based on the first and second set of targeting data, in particular by matching the coordinates of the features measured at the first pose with the coordinates of features measured at the second pose.

The disclosure further relates to a computer program product for a survey system which, when executed by a computing unit of a surveying instrument, causes the automatic execution of the steps of a selected embodiment of the stationing method.

Some embodiments of the computer program product comprise at least one of 1.) a computer program code for the automatic recognition of the environment and the survey task, or 2.) a computer program code for operator input option for designating the environment and the survey task.

BRIEF DESCRIPTION OF THE DRAWINGS

By way of example only, specific embodiments will be described more fully hereinafter with reference to the accompanying figures, wherein.

DETAILED DESCRIPTION

Figure 1:
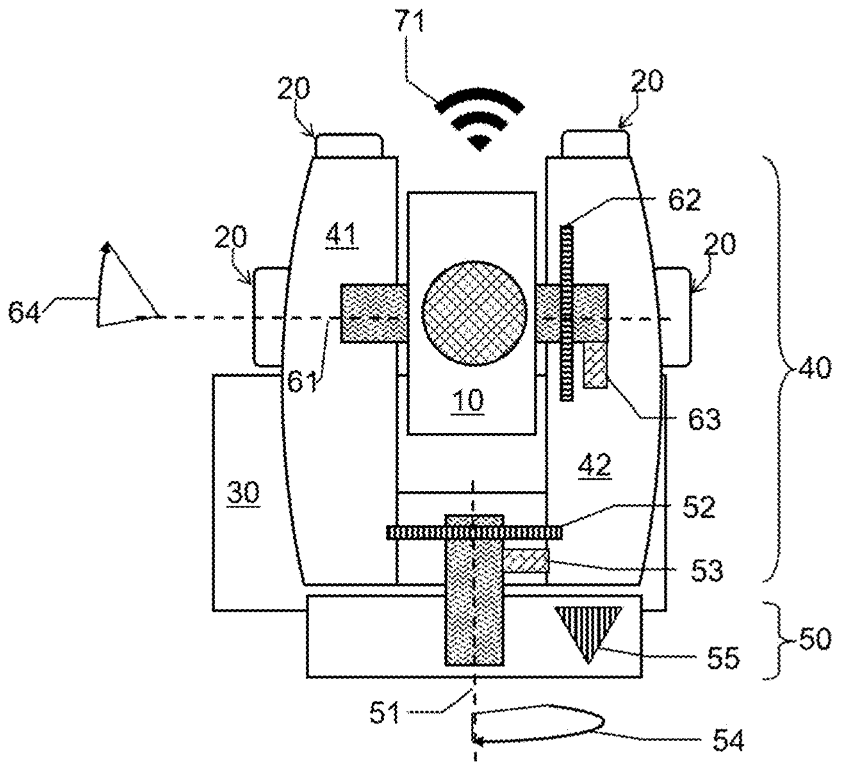
FIG. 1 shows the schematics of an embodiment of a geodetic survey instrument.

FIG. 1 shows a schematic depiction of an embodiment of the survey instrument 40 comprising the targeting unit 10, an IMU 55 as the pose tracking unit, the imaging sensors 20 and the computing unit 30.

The main frame of the survey instrument 40 comprises a first 41 and a second column 42, wherein the targeting unit 10 is attached to both columns 41,42 so that it is tiltable around a tilting axis 61. The tilting of the targeting unit 10 is preferably realized by a motorized axis 62. Manual tilting around the tilting axis 61 might be possible under certain circumstances. The survey instrument 40 comprises a first angle sensor 63 configured to measure a tilting angle 64.

The in FIG. 1 depicted embodiment is a portable integrated survey instrument 40 configured to be mounted on a base 50 and rotatable about a rotational axis 51. The rotation axis 51 might be a vertical axis during the calibration and measurement operations. The survey instrument 40 may be rotated manually under certain circumstances or preferably by a motorized axis 52. The survey instrument comprises a second angle sensor 53 configured to measure a rotation angle 54 of the targeting unit 10 relative to the base 50. The tilting 64 and rotational angles 54 retrieved by the first 63 and second angle sensors 53 are transferred to the computing unit 30. The computing unit 30 provides driving commands for the motorized axes 52,62 in order to target a selected feature with the targeting unit 10.

The in FIG. 1 depicted embodiment of the survey instrument 40 comprises the imaging sensor 20 as a camera array arranged to different locations in the frame. Other embodiments of the imaging sensor 20, in particular a camera co-axial with the targeting unit 10 are also within the sense of the present disclosure.

The in FIG. 1 depicted embodiment of the survey instrument 40 comprises a wireless interface 71. The wireless interface 71 or a wired interface with equivalent functionality, might be configured to receive a digital model of the environment comprising at least one of a map of the environment, a design data of the environment, and a previous measurement data on the environment, as digital data. The computing unit 30 might reference the coarse pose data and/or the fine pose data to the received data. Needless to say that the wireless interface 71 or a wired interface with equivalent functionality might provide measurement data directly or indirectly, in particular utilizing a cloud server, to further survey instruments or to further computing units.

The pose tracking unit in the depicted embodiment comprises an IMU 55. Other positioning sensors, in particular positioning sensors based on GNSS, cellular networks, wireless systems 71, or imaging sensors 20 e.g. VPS or VISLAM are also possible. In the depicted embodiment the IMU 55 is integrated to the base 50. Needless to say, that the person skilled in the art can introduce other placement of the positioning sensor, in particular the pose tracking unit might be integrated to the survey instrument 40, might be distributed that one or more sensors are integrated to the survey instrument 40 and one or more sensors are integrated to the base 50. Alternatively, at least a part of the sensors from the pose tracking unit might be attachable to survey instrument 40 or the base 50 in a temporary fashion. Survey instruments 40 comprising a pose tracking unit are especially suited to benefit from the present disclosure, however the present disclosure can be applied to survey instruments 40 without a pose tracking unit.

FIG. 2-5 shows an embodiment of the stationing method. In this embodiment the first and second set of targeting data comprise the respective distance from the survey instrument 40, while the second set of targeting data are measured after measuring the first set of targeting data. It goes without saying that the present disclosure is not limited to this embodiment. It is also clear to the person skilled in the art that some optional features described with this embodiment might be used in conjunction with other embodiments.

Figure 2:
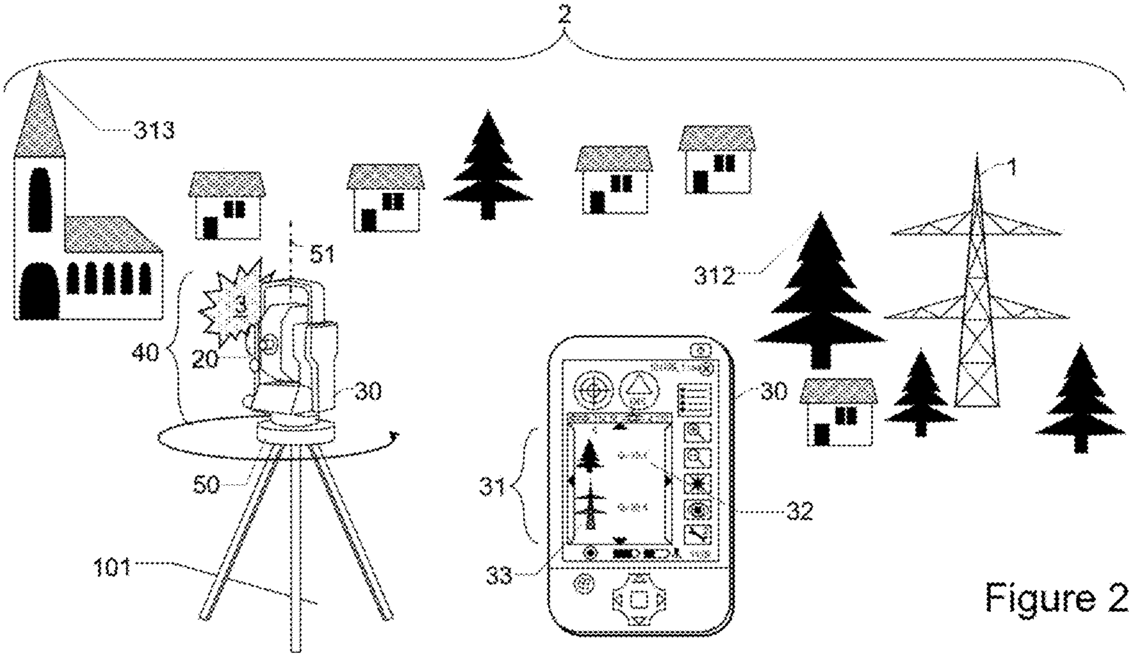
FIG. 2 shows the schematics of creating the catalog of referencing features.

FIG. 2 shows an environment 2 with pre-existing features 1,312,313, which might be natural, e.g. tall trees or man-made e.g. church spires, power masts. The imaging sensor 20 acquires an image 3 of the environment 2. The image 3 might be a true-angle image. The image 3 might be a panoramic image with at least 180° horizontal field of view. The image 3 might be a panoramic image with 360° horizontal field of view. The image 3 might be a full dome image. The image 3 might be stitched from a set of tiles.

Needless to say some of the above features are combinable, i.e. the image 3 might be a true-angle full dome image.

In the FIG. 2 depicted embodiment the imaging sensor 20 is a single camera attached to the side of the survey instrument 40. By rotating the survey instrument 40 around the rotation axis 51 a true-angle panoramic image is created from a set of single images. The imaging sensor 20 might comprise a plurality of cameras and might acquire a panoramic/full dome image without rotating the survey instrument 40.

The first pose 101 of the survey instrument 40 might be geo-referenced by appropriate means. Acquiring the image from a geo-referenced pose is an especially beneficial way of utilizing the present disclosure. However the present disclosure might be utilized in combination with a local reference system, i.e. the fine pose of first pose 101 might be referenced to an arbitrary local system. The present disclosure might also be utilized if fine pose of the first pose 101 is not known. For reasons of brevity and comprehensibility from here on the first pose 101 is assumed to be referenced while the fine pose second pose 102 is not known. The specific features of the reverse case might be applied accordingly.

The computing unit 30 creates a catalog of referencing features 31 based on the image 3. Needless to say that the possible features 1,312,313 might be different depending on the surveying task, e.g. an indoor survey or construction yard might provide different prominent features than e.g. agricultural or a cartographic land survey. In some embodiments the computing unit 30 automatically recognizes the environment 2 and survey task based on the image 3. In some embodiments the computing unit 30 receive the digital model of the environment. The computing unit 30 may automatically recognize the environment 2 and survey task based on the received data. In some embodiments the operator may provide information on the environment 2 and/or the survey task manually. Combinations and alternatives of these embodiments are also possible for the survey instrument 40 and method.

The computing unit 30 calculates a score of applicability 32 for the features 1,312,313 in the catalog of referencing features 31. The score of applicability 32 might be based on the visibility of the feature, the apparent size of the feature, the survey environment 2, the contrast of the feature, and the redundancy and unambiguity of the feature. The score of applicability 32 might be based on a measurability of the feature 1,312,313, i.e. whether the position of the feature 1,312,313 can be measured according to the geodetic accuracy standards. The score of applicability 32 might also be based on the received digital data on the environment and/or the proposed second measurement location. The score of applicability 32 might be provided by a machine learning algorithm. The machine learning might be carried out online or off-line.

The computing unit 30 selects the first set of features from the catalog of referencing features 31 based on the score of applicability 32. The computing unit might provide an image patch 33 clipped from the image 3, wherein the image patch 33 representing a feature 1, in particular the image patch might be utilized to target the represented feature 1. The image patch 33 might be assigned to the represented feature 1. In some embodiment the first set of features is selected without further operator input. In alternative embodiments, the operator might add or remove features to/from the first set of features. The computing unit 30 might evaluate a gross score of applicability based on scores of applicability 32 of the features of the first set of features 1,312,313, in particular on the quantity, the quality and the spatial distribution of the features 1,312,313 in the catalog of referencing features 31 and the first set of features. The computing unit might automatically select further features 1,312,313 based on the image and add the features 1,312,313 to the catalog of referencing features 31 and/or the first set of features if the gross score of applicability does not fulfil a criterion, in particular a threshold criterion. The computing unit might provide an error message, if the gross score of applicability does not fulfil the criterion. The operator might trigger the automatic feature search upon receiving an error message that the gross score of applicability does not fulfil the criterion.

Figure 3:
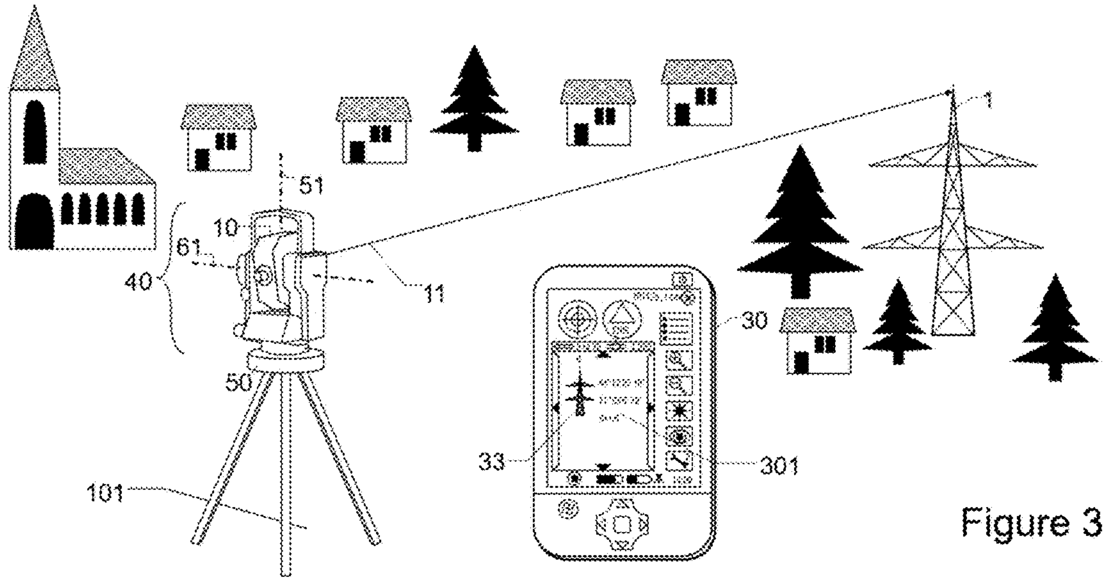
FIG. 3 shows the schematics of targeting and measuring the coordinates for the first set of features.

FIG. 3 shows the measuring of coordinates 301 for a targeted feature 1 from the first set of features. In the depicted embodiment the targeting unit 10 targets the features from the first set of features by rotating the survey instrument 40 around the rotation axis 51 and tilting the targeting unit 10 around the tilting axis 61. The angular coordinates might be derived from the angle readings of the first and second angle sensors, while the distance of the targeted feature might be provided from a rangefinder measurement by a laser beam 11. Based on the angles the distance from the survey instrument and the first pose 101 of the survey instrument the computing unit 30 calculates the absolute coordinates 301 of the targeted feature 1. The computing unit might assign the absolute coordinates 301 to the image patch 33.

Alternatively, at least a portion of the first set of targeting data might be provided by the imaging sensor. While an embodiment where the first set of targeting data comprise the distance from the survey instrument is an especially beneficial way of utilizing the present disclosure, the present disclosure may also be applied if the first set of targeting data is limited to targeting directions.

Figure 4:
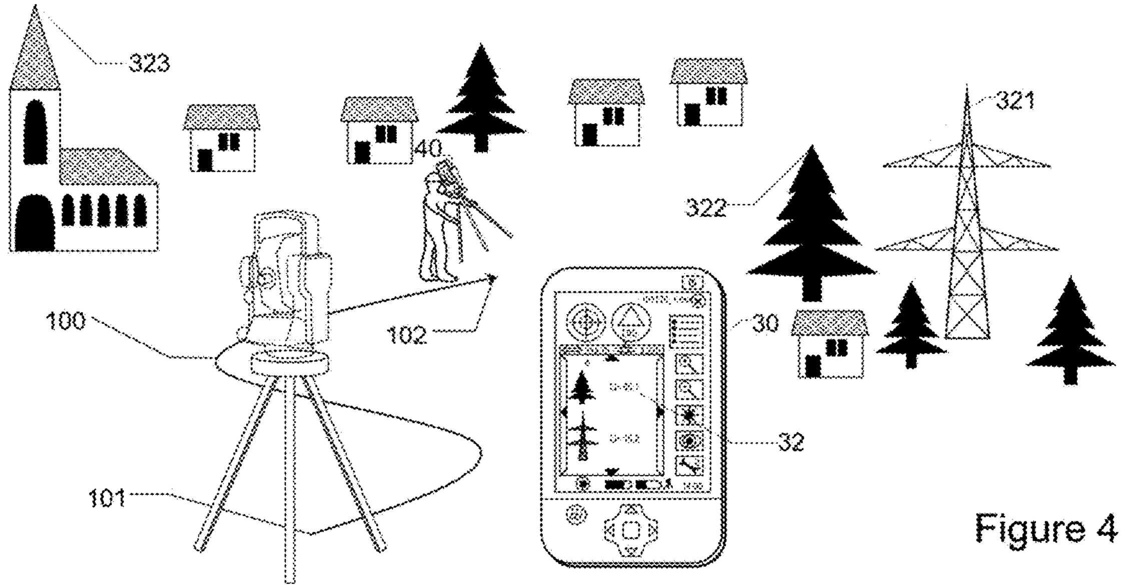
FIG. 4 shows the repositioning of the survey instrument.

FIG. 4 shows the repositioning of the instrument 40 along a random path 100. The pose tracking unit recognizes the relocation of the instrument and provides the coarse pose data on the second pose 102 of the instrument. The fine pose of the second pose 102 is not known. A second set of features comprising features 321,322,323 of the first set of features is selected. The score of applicability 32 might be updated based on the coarse pose data.

The pose tracking unit might be VPS or VISLAM system utilizing the image data provided by the imaging sensor 20. The imaging sensor 20 might also continuously update the score of applicability 32 of the features 321,322,323 during the relocation of the instrument 40. The second set of features might be selected during the relocation. The second set of features can also be selected after relocation is complete.

Figure 5:
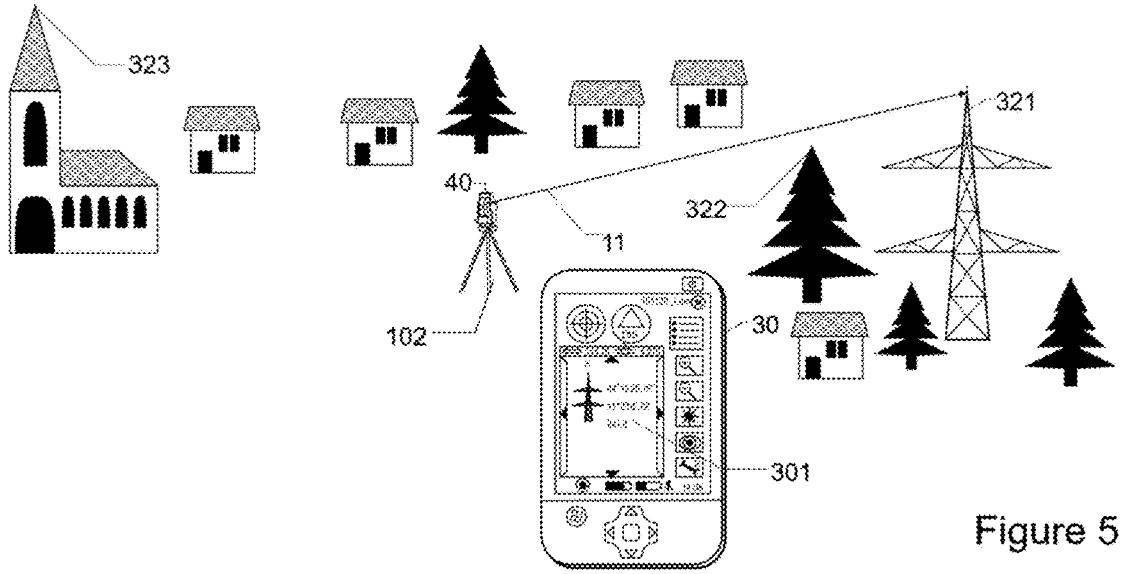
FIG. 5 shows the schematics of targeting and measuring the coordinates for the second set of features.

FIG. 5 shows the measuring of relative coordinates for a targeted feature 321 from the second set of features. The targeting unit targets the feature from the second set of features by rotating the survey instrument 40 around the rotation axis and tilting the targeting unit around the tilting axis. The angular coordinates might be derived from the angle readings of the first and second angle sensors, while the distance of the targeted feature might be provided from a rangefinding measurement by a laser beam 11. Since the targeted feature 321 is comprised by the first set of features its absolute coordinates 301 are known. By measuring the coordinates relative to the second pose 102 for a plurality of features 321,322,323 comprised by the second set of features the fine pose of the second pose 102 of the survey instrument 40 can be provided.

Figure 6:
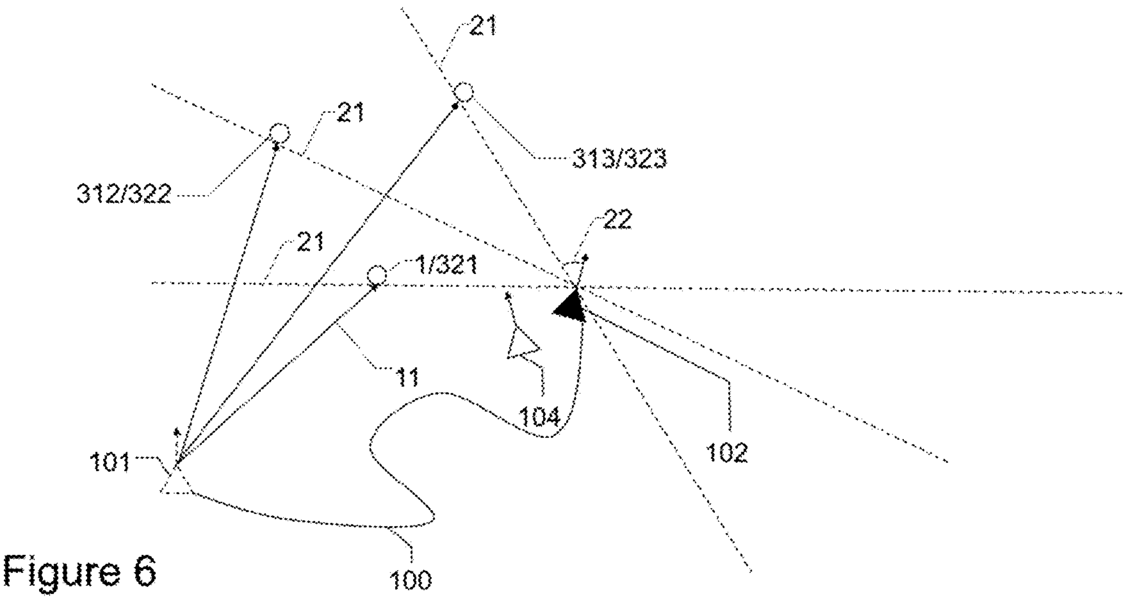
FIG. 6 show the schematics of determining the pose by resection.

FIG. 6 depicts the determination of the fine pose of the second pose 102 based on a resection after the instrument have been carried along a random path 100 from a first pose 101. The coarse pose of the second pose 104 provided by the pose tracking unit might be different from the real/referenced fine pose 102. It goes without saying that the present disclosure might be applied the other way around if the fine pose of the second pose 102 is known and the fine pose of the first pose 101 is unknown.

The first set of targeting data for the features 1,312,313 of the first set of features are measured by the targeting unit 10 analogous to the situation depicted in FIG. 3. The first set of targeting data comprise the distance from the survey instrument in the first pose 101. The second set of targeting data are limited to data regarding the targeting directions 21. The second set of targeting data may comprise angular components 22 of the spherical coordinates of the features 321, 322,323 relative to the second pose 102. The fine pose of the second pose 102 might be an intersection of lines representing the targeting directions 21.

It goes without saying that the first 101 and second pose 102 are distinguishable only by the fact that an image of the environment have to be acquired in the first pose 101. Consequently the resection depicted in FIG. 6 can also be applied if the first set of targeting data are limited to data regarding the targeting directions 21, while the second set of targeting data comprises the distance from the survey instrument in the first pose 102. Moreover the utilization of the "first pose" 101, "first set of targeting data" does not imply that measuring the first set of targeting data from the first pose 101 is precedent to measuring the second set of targeting data. On the contrary the present disclosure can also be applied if measuring the second set of targeting data is precedent to measuring the first set of targeting data.

Figure 7:
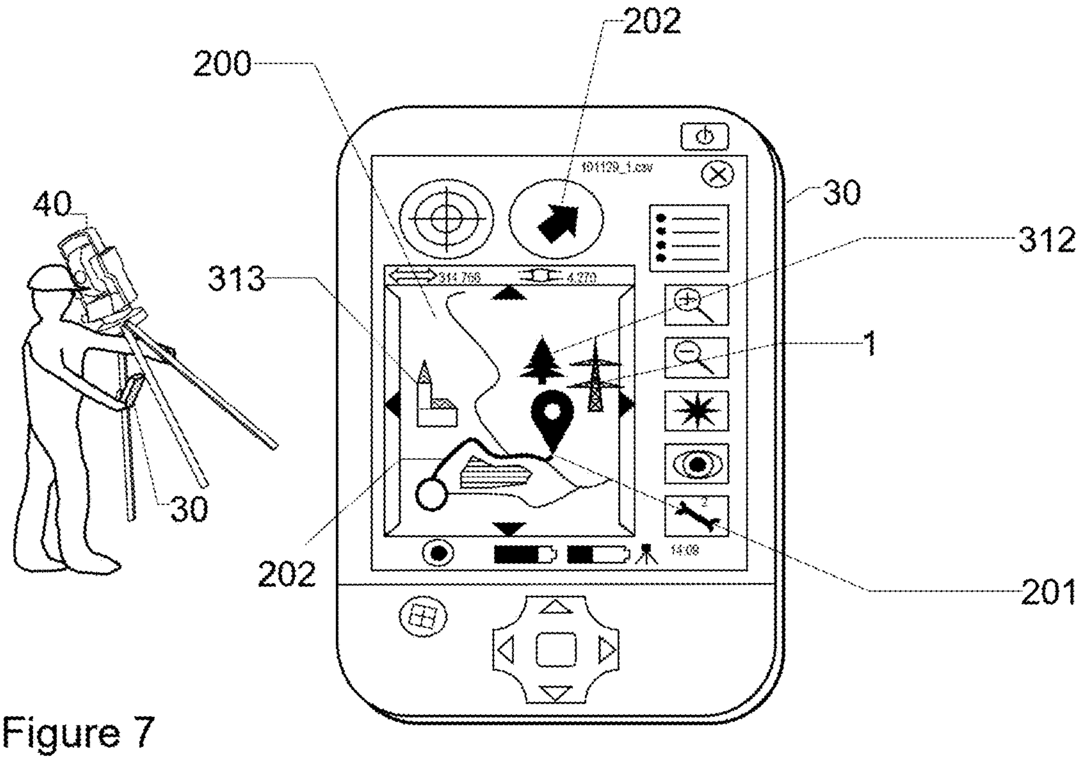
FIG. 7 shows the proposed second location and the guidance instructions for the operator.

FIG. 7 shows an embodiment wherein the computing unit 30 is configured to receive the map 200 of the environment 2. Alternatively instead of the map 200 the digital model might be a design data, previous measurement data, or any suitable alternative. The features 1,312,313 of the catalog of referencing features are referenced to the map 200.

The operator might select a requested second location for the continuation of the survey task. The computing unit 30 calculate a calculated visibility of the first set of features in the proximity of the requested second location. The computing unit 30 calculate a proposed second location 201 based on the calculated visibility of the features 1,312,313 in the first set of features. The computing unit 30 might consider other parameters in calculating the proposed second location 201. The other parameters might comprise feature related parameters, in particular apparent size of the feature, contrast of the feature, and redundancy and unambiguity of the feature. The computing might consider the accessibility of the proposed second location 201. Needless to say that the person skilled in the art could combine these and similar parameters for selecting the proposed second location 201.

The computing unit 30 might provide guidance instruction 202 to reach the proposed second location 201. The guidance instructions 202 might comprise a path plotted in the map 200, arrows showing the walking direction, or similar visual or alternative, in particular audio, instructions. The computing unit 30 might comprise a handheld unit to display the guidance instructions 202.

Figure 8:
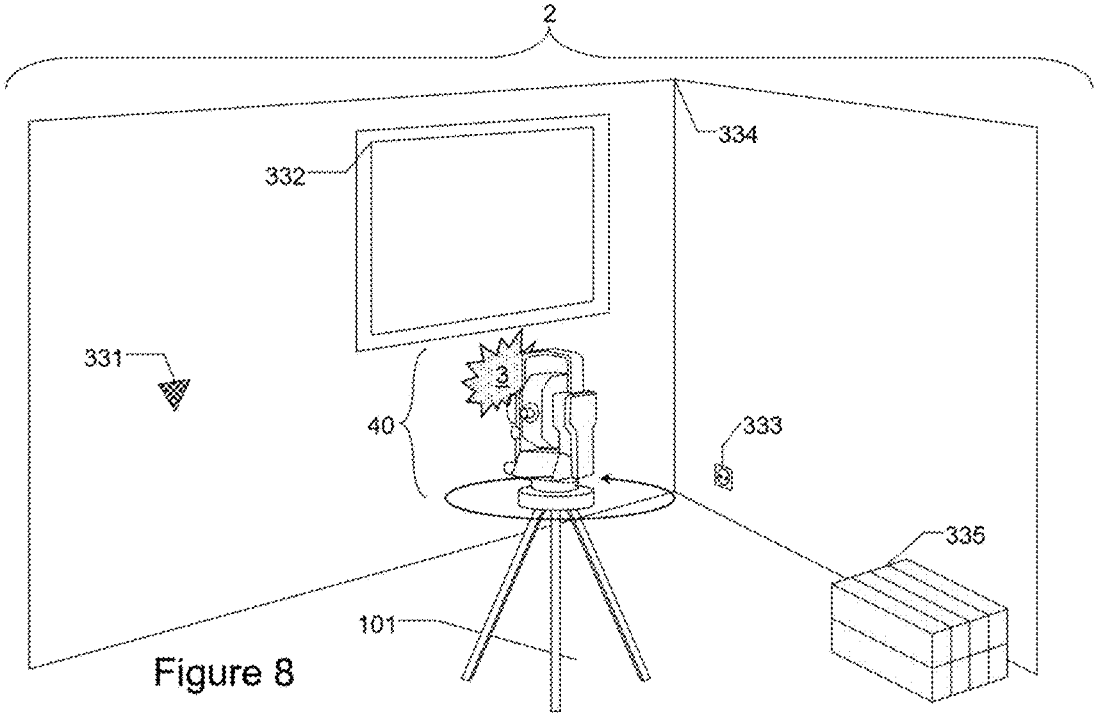
FIG. 8 shows indoor features for a catalog of referencing features.

The examples depicted in FIGS. 2-5 represent an outdoor application. The present disclosure is in no way limited to these applications. The specific features of indoor applications or mixed in- and outdoor applications, in particular the creation of the catalog of referencing features, the calculation score of applicability, referencing the features to the design data, and providing the proposed second location 201 might be applied accordingly. FIG. 8 show some exemplary features which might be utilized according to the present disclosure including previously placed reference markers 331, door- or window frames 332, power sockets 333, corners of walls 334, construction materials 335, etc.

In some embodiments the computing unit 30 might identify from the image 3 taken, the type of environment 2 and the survey task. In some embodiments the operator might select the type of environment 2 and the survey task. For some embodiments the computing unit 30 is configured to receive the digital model of the environment. The computing unit 30 might identify from the received digital model the type of environment 2 and the survey task. Needless to say that the said option are combinable with each other and/or with similar alternatives. The score of applicability might be calculated in respect to the environment 2 and the survey task.

Although aspects are illustrated above, partly with reference to some specific embodiments, it must be understood that numerous modifications and combinations of different features of the embodiments can be made. All of these modifications lie within the scope of the appended claims.

The invention claimed is:

1. A geodetic survey instrument comprising a base unit a support unit being mounted on the base and configured to be rotatable relative to the base by a motorized axis, a first angle sensor configured to measure a rotation angle of the support unit, a targeting unit, configured to target an object in an environment and to provide a targeting data measurement of the targeted object, the targeting unit being mounted on the support unit and being tiltable around a motorized tilting axis, comprising a beam exit of a distance measuring beam of a distance meter, wherein the measuring beam of the distance meter defining a targeting direction, a second angle sensor configured to measure the tilting angle of the targeting unit relative to the support unit, wherein the targeting data comprises angular coordinates derived from the angle readings of the first and second angle sensors, and distance data regarding the targeted object, the distance data being provided by rangefinder measurement by the measuring beam, an imaging sensor, wherein the optical axis of the imaging sensor being referenceable to the targeting direction of the targeting unit, and a computing unit, an automatic stationing functionality being configured for providing the automatic execution of:

acquiring an image of the environment by the imaging sensor in a first pose of the instrument, creating or updating a catalog of referencing features based on the image, and calculating for each referencing feature a score of applicability by the computing unit, wherein the score of applicability characterizing an identifiability and measurability of the features in an image acquired from different locations by the imaging sensor, wherein identifiability characterizes at least a retrievability of a given referencing feature in images acquired from different locations by the imaging sensor and measurability characterizes whether coordinates of the given referencing feature can be measured according to the geodetic accuracy standards, selecting a first set of features comprising a plurality of the features from the catalog of referencing features fulfilling a selection criterion regarding at least the score of applicability by the computing unit and, in a first pose of the instrument providing measurement data for a first set of targeting data regarding targeting directions of the features in the first set of features, providing the first set of targeting data and assigning the targeting directions in the first set of targeting data to the respective features of the first set of features, selecting a second set of features from the first set of features by the computing unit based on the score of applicability for each of the features, in a second pose of the instrument providing measurement data for a second set of targeting data regarding targeting directions of the features of the second set of features, providing the second set of targeting data and assigning the targeting directions in the second set of targeting data to the respective features of the second set of features, wherein at least one of the first and the second set of targeting data further comprising data regarding distances of the features of the respective set of features from the survey instrument, and determining a fine pose of the second pose relative to the first pose based on the first and second set of targeting data.

2. The survey instrument according to claim 1 wherein the survey instrument further comprising a pose tracking unit configured to provide a tracking of coarse pose data of the instrument, the automatic stationing functionality further comprising providing the tracking of the coarse pose data by the pose tracking unit, the selection a second set of features from the first set of features being further based on the tracking of the coarse pose data.

3. The survey instrument according to claim 1 wherein the imaging sensor being arranged and configured for use in a sighting unit of the targeting unit for aligning the targeting direction onto a target to be measured.

4. The survey instrument according to claim 1 wherein automatic stationing functionality further comprising deriving a gross score of applicability, based on scores of applicability of the features of the first set of features, and providing feedback to an operator on a readiness for relocation based on the gross score of applicability.

5. The survey instrument according to claim 1 wherein the computing unit being configured to receive a digital model of the environment comprising at least one of a map of the environment, a design data of the environment, and a previous targeting data measurement data of the environment, the computing unit being further configured to reference the fine pose and/or a coarse pose of the survey instrument to the digital model, and reference the position of the features in the catalog of referencing features to the digital model.

6. The survey instrument according to claim 5, wherein the computing unit being further configured to receive an operator input on a requested second location, calculate a calculated visibility and/or a calculated score of applicability of the first set of features in the proximity of the requested second location, calculate a proposed second location for the instrument based on the calculated visibility and/or the calculated score of applicability of the first set of features, provide guidance instructions for the operator to reach the proposed second location.

7. The survey instrument according to claim 1 wherein the computing unit being configured to identify flat surfaces in the environment based on the image and to calculate targeting data of the flat surface based on plurality of point targeting data contained by the flat surface.

8. The survey instrument according to claim 1 being configured to tag a survey data with a tagging pose of the survey instrument, wherein the tagging pose being either provided by the fine pose data, or the coarse pose data, store the first set of features, the first set of targeting data, the second set of features and the second set of targeting data, update the tagging pose of the survey instrument based on the stored first set of targeting data and the stored second set of targeting data.

9. A method for identifying a fine pose of a geodetic survey instrument, the method comprising the steps of acquiring an image of the environment by an imaging sensor of the instrument in a first pose of the instrument, creating or updating a catalog of referencing features based on the image, and calculating for each referencing feature a score of applicability, wherein the score of applicability characterizing an identifiability and measurability of the features in an image acquired from different locations by the imaging sensor, wherein identifiability characterizes at least a retrievability of a given referencing feature in images acquired from different locations by the imaging sensor and measurability characterizes whether coordinates of the given referencing feature can be measured according to the geodetic accuracy standards, selecting a first set of features comprising a plurality of the features from the catalog of referencing features fulfilling a selection criterion regarding at least the score of applicability by the computing unit and, in a first pose of the instrument providing measurement data for a first set of targeting data regarding coordinates of the features in the first set of features, providing the first set of targeting data and assigning the coordinates in the first set of targeting data to the respective features of the first set of features, performing a relocation of the instrument and, selecting a second set of features from the first set of features based on the score of applicability for each of the features and, in a second pose of the instrument providing measurement data for a second set of targeting data regarding targeting directions of the features of the second set of features, providing the second set of targeting data and assigning the targeting directions in the second set of targeting data to the respective features of the second set of features, wherein at least one of the first and the second set of targeting data further comprising data regarding distances of the features of the respective set of features from the survey instrument, and determining a fine pose of the second pose relative to the first pose based on the first and second set of targeting data.

10. The method according to claim 9, wherein at least one of the first pose and the second pose being a referenced absolute pose.

11. The method according to claim 9, further comprising acquiring a second image of the environment at the second pose, identifying at least a part of the features comprised by first set of features based on image matching, and calculating a second score of applicability for the features in the first set of features, selecting the second set of features comprising a plurality of features from the first set of features based on the score of applicability and further based on the second score of applicability.

12. The method according to claim 9, wherein measuring the second set of targeting data being precedent to measuring the first set of targeting data.

13. The method according to claim 12, wherein the instrument being relocated along a plurality of poses, wherein at least two poses in the plurality of the poses being referenced poses and at least one pose in the plurality of the poses being a nonreferenced pose, the method further comprising updating a tagging pose of the at least one nonreferenced pose by weighting the second set of targeting data derived in respect to the at least two referenced poses.

14. A non-transitory computer-readable storage medium storing instructions for a survey system, which instructions, when executed by a computing unit of a survey instrument, cause the automatic execution of the steps of the method according to claim 9.

15. A non-transitory computer-readable storage medium storing instructions for a survey system, which instructions, when executed by a computing unit of a survey instrument, cause the automatic execution of the steps of the method according to claim 13.

* * * * *